United States Patent
Chung

(10) Patent No.: US 10,398,234 B2
(45) Date of Patent: Sep. 3, 2019

(54) MODULAR BED

(71) Applicant: ULIFE HEALTHCARE INC., Taichung (TW)

(72) Inventor: Ya-Hsin Chung, Taichung (TW)

(73) Assignee: ULIFE HEALTHCARE INC., Taichung (TW)

( * ) Notice: Subject to any disclaimer, the term of this patent is extended or adjusted under 35 U.S.C. 154(b) by 275 days.

(21) Appl. No.: 15/586,551

(22) Filed: May 4, 2017

(65) Prior Publication Data

US 2018/0125249 A1    May 10, 2018

(30) Foreign Application Priority Data

Nov. 10, 2016  (TW) .............................. 105217161 U

(51) Int. Cl.
| A47C 19/02 | (2006.01) |
| A61G 7/015 | (2006.01) |
| A47C 20/04 | (2006.01) |
| A47C 17/04 | (2006.01) |
| F16B 12/10 | (2006.01) |
| F16B 12/54 | (2006.01) |
| A47C 20/08 | (2006.01) |

(52) U.S. Cl.
CPC ............ *A47C 17/04* (2013.01); *A47C 19/021* (2013.01); *A47C 20/08* (2013.01); *A61G 7/015* (2013.01); *F16B 12/10* (2013.01); *F16B 12/54* (2013.01); *A47C 20/04* (2013.01); *F16B 2012/106* (2013.01)

(58) Field of Classification Search
CPC .......... A61G 7/015; A61G 7/05; A61G 13/08; A47C 20/04; A47C 20/041; A47C 19/005; A47C 19/02; A47C 19/021; A47C 19/024; A47C 19/025
USPC ........ 5/613, 617, 618, 620, 200.1, 201, 285, 5/286, 310
See application file for complete search history.

(56) References Cited

U.S. PATENT DOCUMENTS

| 3,898,702 | A | * | 8/1975 | Goodman | ............... | A61G 7/015 5/618 |
| 5,257,428 | A | * | 11/1993 | Carroll | ................. | A47C 19/122 5/201 |
| 6,006,379 | A | * | 12/1999 | Hensley | ............... | A47C 20/041 5/616 |
| 6,101,647 | A | * | 8/2000 | Stroud | ................. | A47C 20/041 5/613 |
| 6,209,157 | B1 | * | 4/2001 | Hensley | ............... | A47C 20/041 5/613 |
| 6,216,295 | B1 | * | 4/2001 | Pearson | ............... | A47C 20/041 5/613 |

(Continued)

*Primary Examiner* — Robert G Santos
(74) *Attorney, Agent, or Firm* — Knobbe Martens Olson & Bear LLP

(57) ABSTRACT

A modular adjustable bed includes a bed frame unit, front and rear sliding frames disposed to be slidable on the bed frame unit, a head support frame pivotally mounted on the front sliding frame, a pair of prop links coupling the head support frame to a front frame of the bad frame unit, and a leg support frame pivotally mounted on the rear sliding frame. When the head support frame is driven to be displaced to a head elevated position from a head normal position, the front sliding frame is displaced to a front position from a rear position. The leg support frame can be driven to move from a leg normal position to a leg elevated position.

10 Claims, 13 Drawing Sheets

(56) References Cited

U.S. PATENT DOCUMENTS

| | | | | |
|---|---|---|---|---|
| 6,276,011 B1* | 8/2001 | Antinori | A47C 20/041 | 5/613 |
| 6,393,641 B1* | 5/2002 | Hensley | A47C 20/041 | 5/613 |
| 6,708,358 B2* | 3/2004 | Hensley | A47C 20/041 | 5/613 |
| 7,448,100 B1* | 11/2008 | Shih | A61G 7/015 | 5/600 |
| 7,530,125 B2* | 5/2009 | Neuenswander | A47C 20/041 | 5/616 |
| 7,698,761 B2* | 4/2010 | Neuenswander | A47C 20/041 | 5/611 |
| 7,900,302 B2* | 3/2011 | Long | A47C 20/08 | 5/617 |
| 8,555,438 B2* | 10/2013 | Turner | A61G 7/015 | 5/618 |
| 9,049,942 B2* | 6/2015 | Huang | A47C 20/041 | |
| 9,456,698 B2* | 10/2016 | Oh | A47C 19/122 | |
| 9,956,127 B2* | 5/2018 | Turner | A61G 7/015 | |
| 2001/0000828 A1* | 5/2001 | Hensley | A47C 20/041 | 5/618 |
| 2009/0019640 A1* | 1/2009 | Neuenswander | A47C 20/041 | 5/618 |
| 2009/0094748 A1* | 4/2009 | Long | A47C 20/041 | 5/613 |
| 2009/0178201 A1* | 7/2009 | Lujan | A47C 20/027 | 5/618 |
| 2009/0193587 A1* | 8/2009 | Neuenswander | A47C 20/041 | 5/618 |
| 2009/0211028 A1* | 8/2009 | Richmond | A47C 20/041 | 5/618 |
| 2010/0122415 A1* | 5/2010 | Turner | A61G 7/015 | 5/618 |
| 2014/0013512 A1* | 1/2014 | Turner | A61G 7/015 | 5/618 |
| 2014/0250599 A1* | 9/2014 | Cassell | A61G 7/015 | 5/613 |
| 2015/0121623 A1* | 5/2015 | Huang | A47C 20/041 | 5/616 |
| 2016/0206111 A1* | 7/2016 | Oh | A47C 19/122 | |
| 2018/0125249 A1* | 5/2018 | Chung | A47C 17/04 | |
| 2018/0125252 A1* | 5/2018 | Chung | A47C 19/005 | |

* cited by examiner

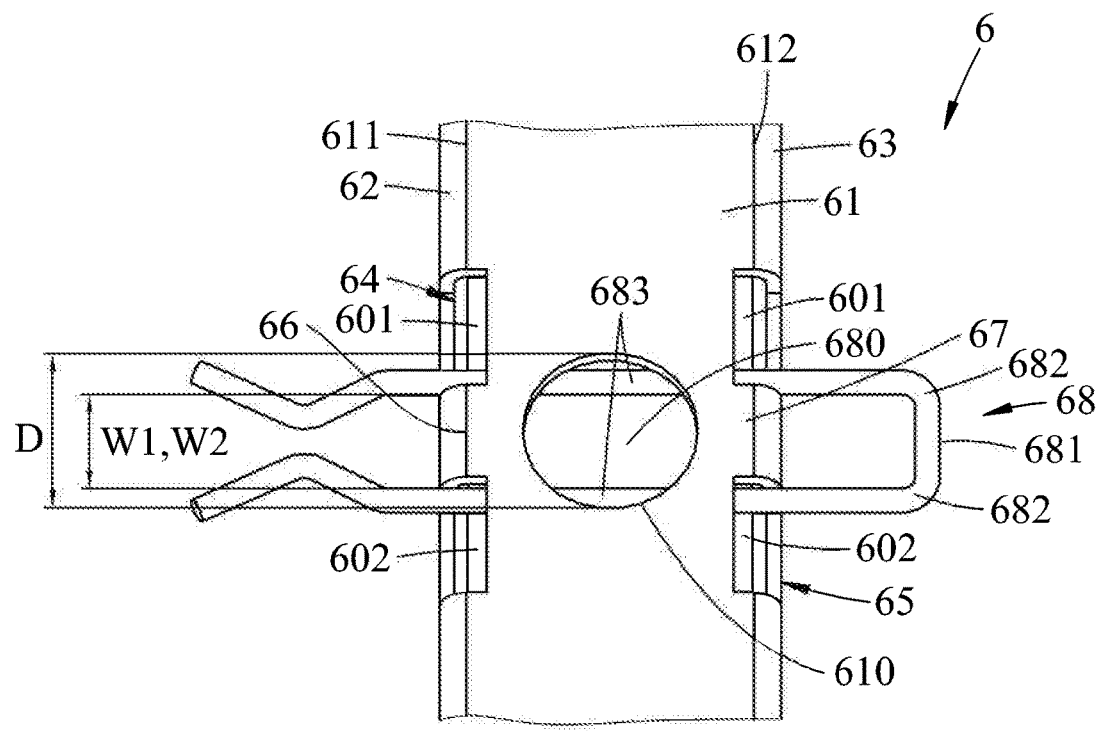
FIG.9
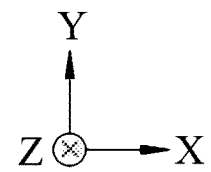

MODULAR BED

CROSS-REFERENCE TO RELATED APPLICATION

This application claims priority from Taiwanese patent application no. 105217161, filed on Nov. 10, 2016.

FIELD

The disclosure relates to a modular bed, more particularly to a modular adjustable bed.

BACKGROUND

Because it is complicated to assemble parts of a conventional bed is complicated, the conventional bed is normally assembled in advance in the factory before transportation to the user's place. In this connection, it is not convenient for transportation of the bulky assembled bed.

SUMMARY

Therefore, an object of the disclosure is to provide a modular bed which may be easily assembled by the user.

According to a first aspect of the disclosure, a modular bed includes a bed frame unit and a middle coupler unit. The bed frame unit includes a front frame and a rear frame. The front frame includes a front left beam and a front right beam, which extend in a direction of a longitudinal axis, respectively, and which are spaced apart from each other in a transverse direction relative to the longitudinal direction. Each of the front left and right beams has a first connected end. The rear frame includes a rear left beam and a rear right beam, which extend in the longitudinal direction, respectively, and which are spaced apart from each other in the transverse direction. Each of the rear left and right beams has a second connected end which is disposed to confront with the first connected end of a corresponding one of the front left and right beams to permit each of the rear left and right beams to be in-line alignment with a corresponding one of the front left and right beams. The middle coupler unit is configured to couple the front frame with the rear frame, and includes a left coupler member, a right coupler member, a connecting rod interconnecting the left and right coupler members. Each of the left and right coupler members has a front segment mounted to the first connecting end of a corresponding one of the front left and right beams, and a rear segment mounted to the second connecting end of a corresponding one of the rear left and right beams.

According to a second aspect of the disclosure, a modular bed includes a front frame, a rear frame, a front sliding frame, a rear sliding frame, a head support frame, a pair of prop links, and a leg support frame. The front frame includes a front left beam, a front right beam, and a front transverse beam. Each of the front left and right beams extends in a direction of a longitudinal axis to terminate at a front end and a first connected end, and has an elongated groove extending in the longitudinal direction. The front left and right beams are spaced apart from each other in a transverse direction relative to the longitudinal direction. The front transverse beam extends to interconnect the front ends of the front left and right beams. The rear frame includes a rear left beam, a rear right beam, and a rear transverse beam. Each of the rear left and right beams extends in the longitudinal direction to terminate at a rear end and a second connected end, and has an elongated groove extending in the longitudinal direction. The second connected end is disposed to confront with the first connected end of a corresponding one of the front left and right beams to permit each of the rear left and right beams to be in-line alignment with a corresponding one of the front left and right beams, such that the elongated grooves of the front and rear left beams define a left track, and the elongated grooves of the front and rear right beams defines a right track. The rear transverse beam extends to interconnect the rear ends of the second left and right beams. The front sliding frame includes a pair of front slider bars, a mounting bar, and a front connecting bar. Each of the front slider bars extends in the longitudinal direction to terminate at a front proximate end and a front distal end relative to the front transverse beam. The front slider bars are configured to be slidably mounted on the left and right tracks, respectively. The mounting bar extends in the transverse direction to interconnect the front proximate ends of the front slider bars so as to permit the front slider bars to move with the mounting bar along the left and right tracks, respectively. The mounting bar is movable along the longitudinal direction so as to permit the first sliding frame to move between a front position and a rear position. The front connecting bar extends in the transverse direction to interconnect the front distal ends of the front sliding bars so as to move with the front slider bars. The rear sliding frame includes a pair of rear slider bars, a rear connecting bar, a rear trailing bar, and a rear leading bar. Each of the rear slider bars has a rear proximate end segment and a rear distal end segment opposite to each other in the longitudinal direction. The rear slider bars are configured to be slidably mounted on the left and right tracks, respectively. The rear connecting bar extends in the transverse direction to interconnect the rear proximate end segments of the rear slider bars so as to move therewith. The rear connecting bar is configured to be secured to the front connecting bar so as to permit the rear sliding frame to move with the front sliding frame along the longitudinal direction. The rear trailing bar extends in the transverse direction to interconnect the rear distal end segments of the rear slider bars. The rear leading bar extends in the transverse direction to interconnect the rear sliding bars, and is disposed between the rear connecting bar and the rear trailing bar. The head support frame includes a pair of head support links and a front cross bar. Each of the head support links extends along a front lengthwise line, and has a front pivot end mounted pivotally on the mounting bar in proximity to a corresponding one of the front slider bars, and a front coupling end opposite to the front pivot end. The front cross bar extends in the transverse direction, and is configured to interconnect the front coupling ends of the head support links so as to permit the head support links to angularly move with the front cross bar such that the head support frame is turnable between a head normal position, where the front lengthwise line is substantially parallel to the longitudinal axis, and a head elevated position, where the front lengthwise line intersects with the longitudinal axis to form an included angle. Each of the prop links has a first end pivotally mounted to the front frame at or in proximity to the front transverse beam, and a second end pivotally mounted to a corresponding one of the head support links such that when the head support frame is displaced to the head elevated position from the head normal position, the front sliding frame is displaced to the front position from the rear position. The leg support frame includes a left linkage, a right linkage, and a transverse coupling bar. The left linkage includes a first left link, a second left link, and a left coupling bar. Each of the first and second left links extends along a left lengthwise line, and has a left coupling end, and a left pivot end that is opposite to the left coupling end, and that is pivotally mounted on a corresponding one of the rear leading bar and the rear trailing bar. The left coupling bar interconnects the left coupling ends of the first and second left links so as to move with the first and second left links. The right linkage is spaced apart from the left linkage in the transverse direction, and includes a first right link, a second right link, and a right coupling bar. Each of the first and second right links extends along aright lengthwise line, and has a right coupling end, and a right pivot end that is opposite to the right coupling end, and that is pivotally mounted on the corresponding one of the rear leading bar and the rear trailing bar. The right coupling bar interconnects the right coupling ends of the first and second right links so as to move with the first and second right links. The transverse coupling bar interconnects the left coupling end of the first left link and the right coupling end of the first right link so as to permit the left and right linkage to move with the transverse coupling bar, such that the leg support frame is turnable between a leg normal position, where each of the left and right lengthwise lines is substantially parallel to the longitudinal axis, and a leg elevated position, where each of the left and right lengthwise lines intersects with the longitudinal axis to form an included angle.

BRIEF DESCRIPTION OF THE DRAWINGS

Other features and advantages of the disclosure will become apparent in the following detailed description of the embodiment with reference to the accompanying drawings, in which:

FIG. 9 is a fragmentary enlarged view of the modular bed illustrating one of socket units;

DETAILED DESCRIPTION

Figure 1:
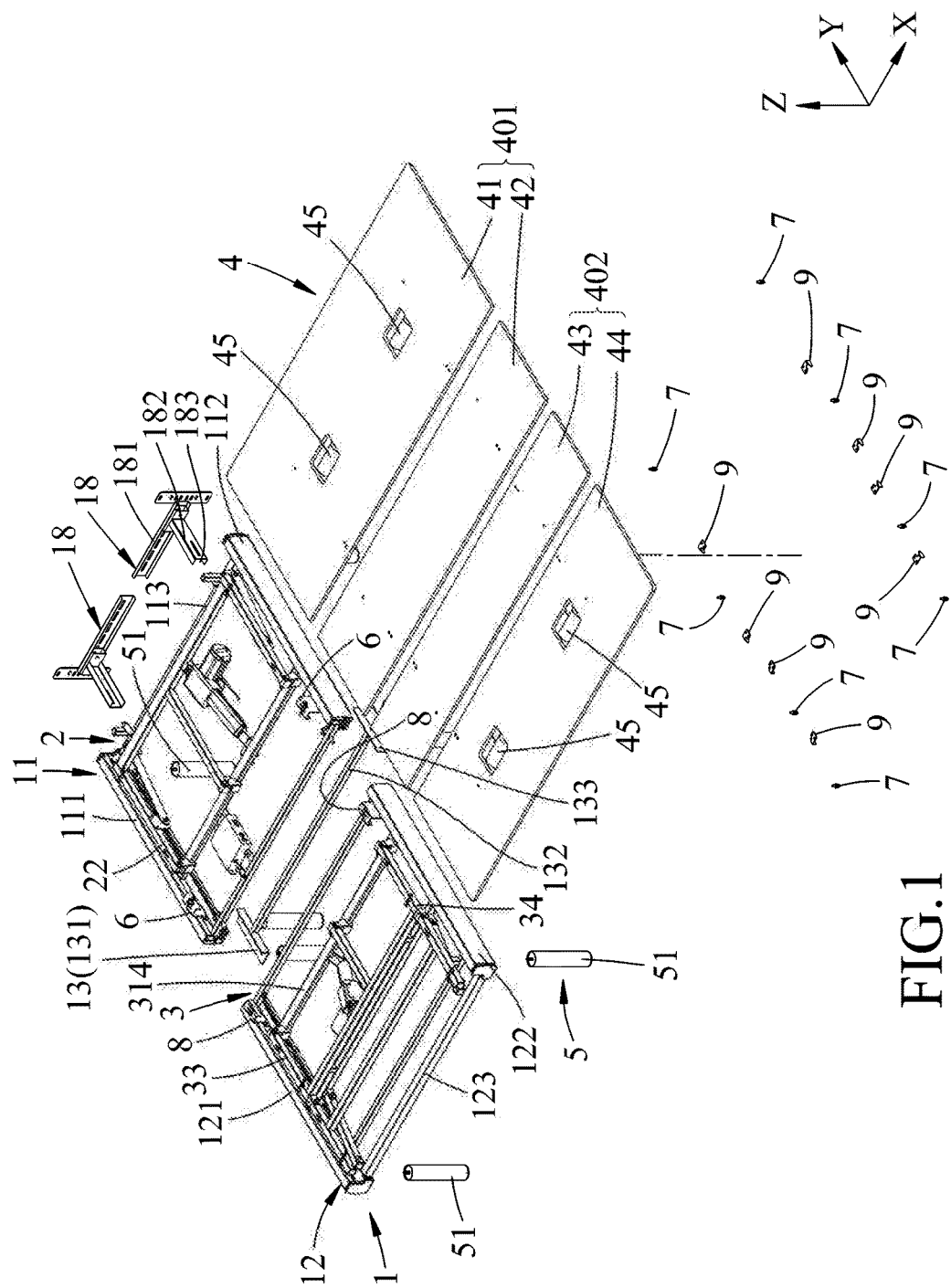
FIG. 1 is an exploded perspective view of a modular bed according to an embodiment of the disclosure.

Before the disclosure is described in greater detail, it should be noted that where considered appropriate, reference numerals have been repeated among the figures to indicate corresponding or analogous elements, which may optionally have similar characteristics.

Figure 2:
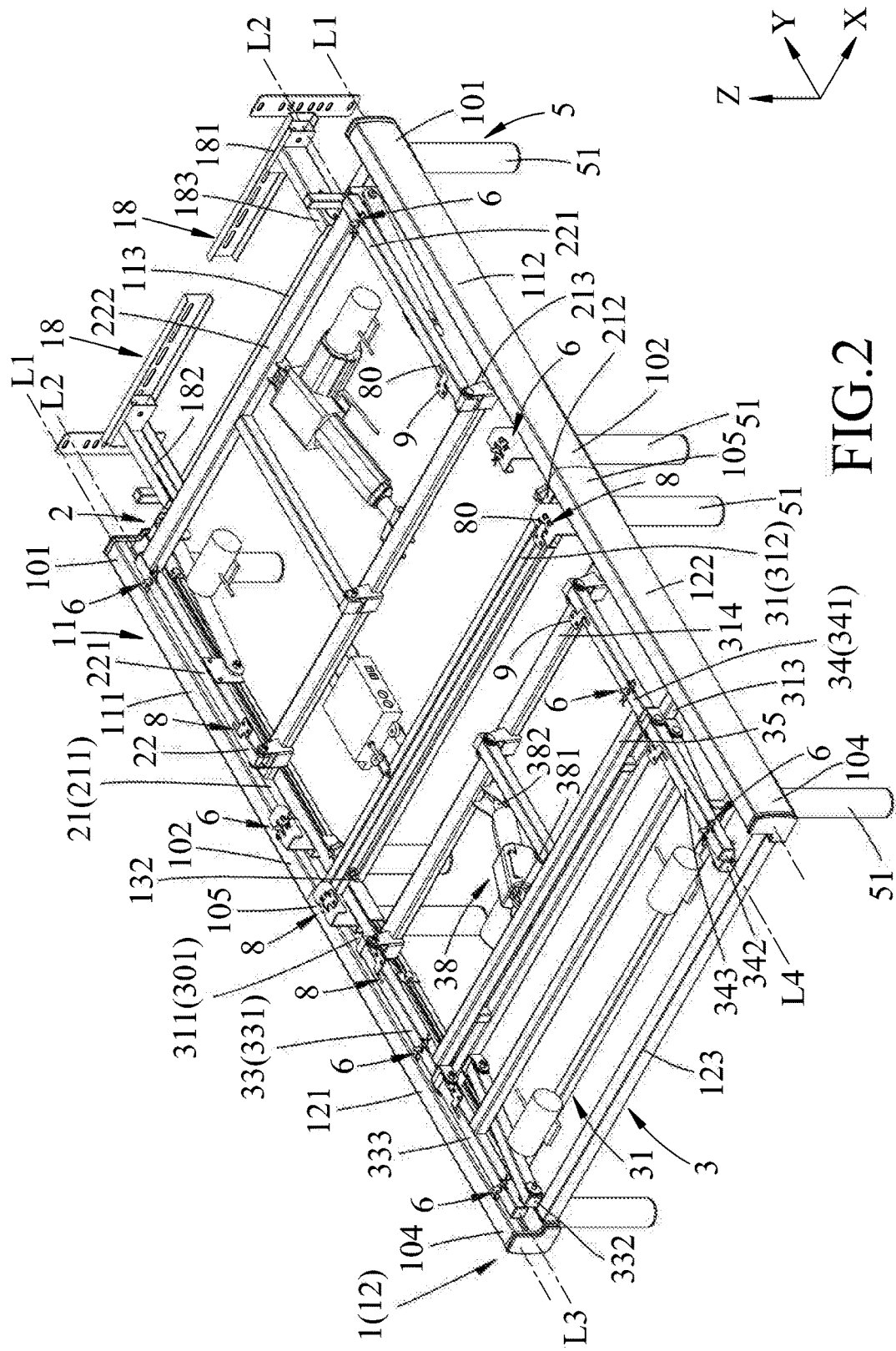
FIG. 2 is a perspective view of the modular bed with omission of a bed panel assembly.
Figure 3:
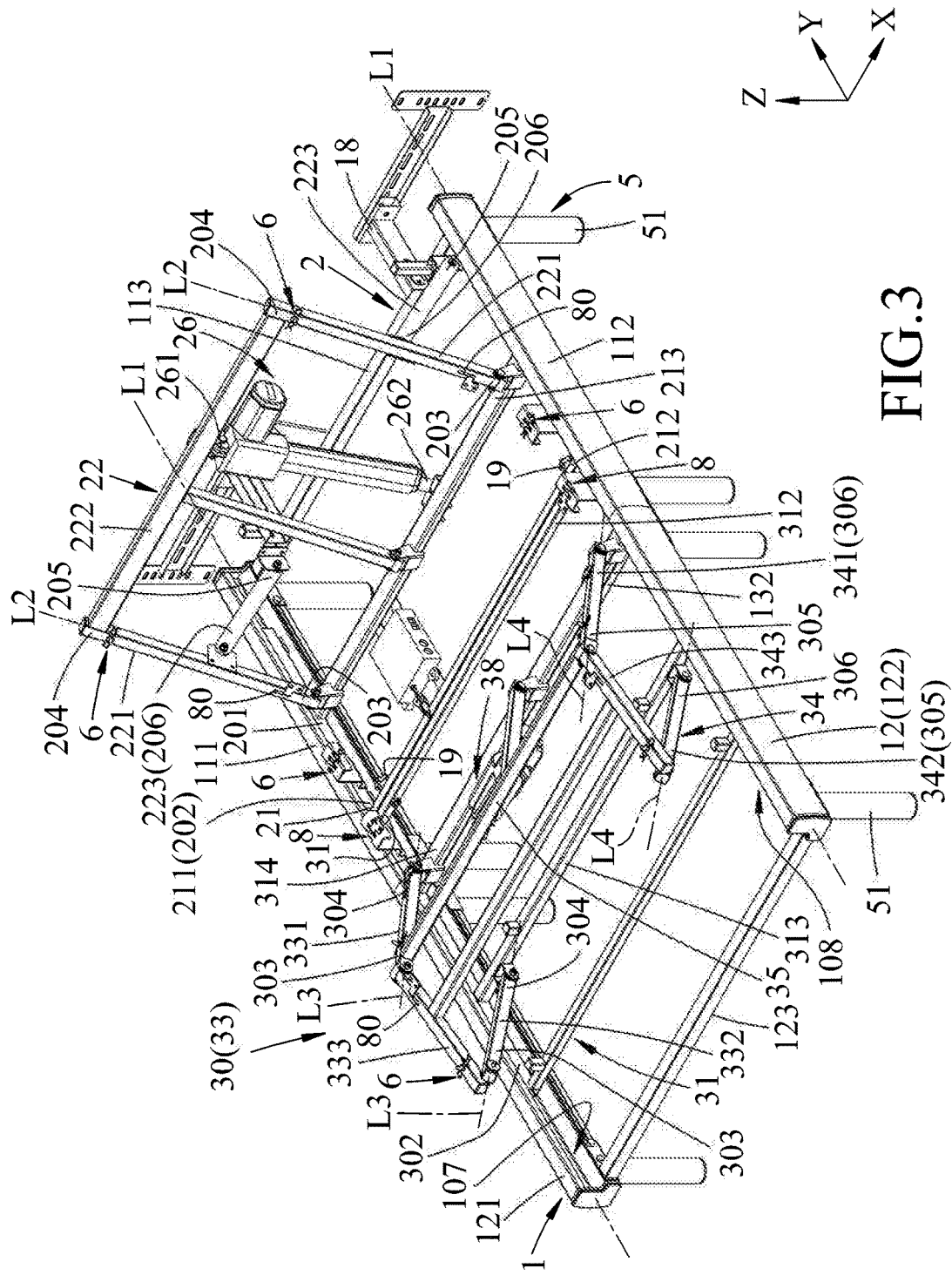
FIG. 3 is similar to FIG. 2 but illustrating a head support frame in a head elevated position and a leg support frame in a leg elevated position.

With reference to FIGS. 1 to 3, a modular bed is shown to include a bed frame unit 1, a front support unit 2, and a rear support unit 3.

The bed frame unit 1 includes a front frame 11 and a rear frame 12.

Figure 5:
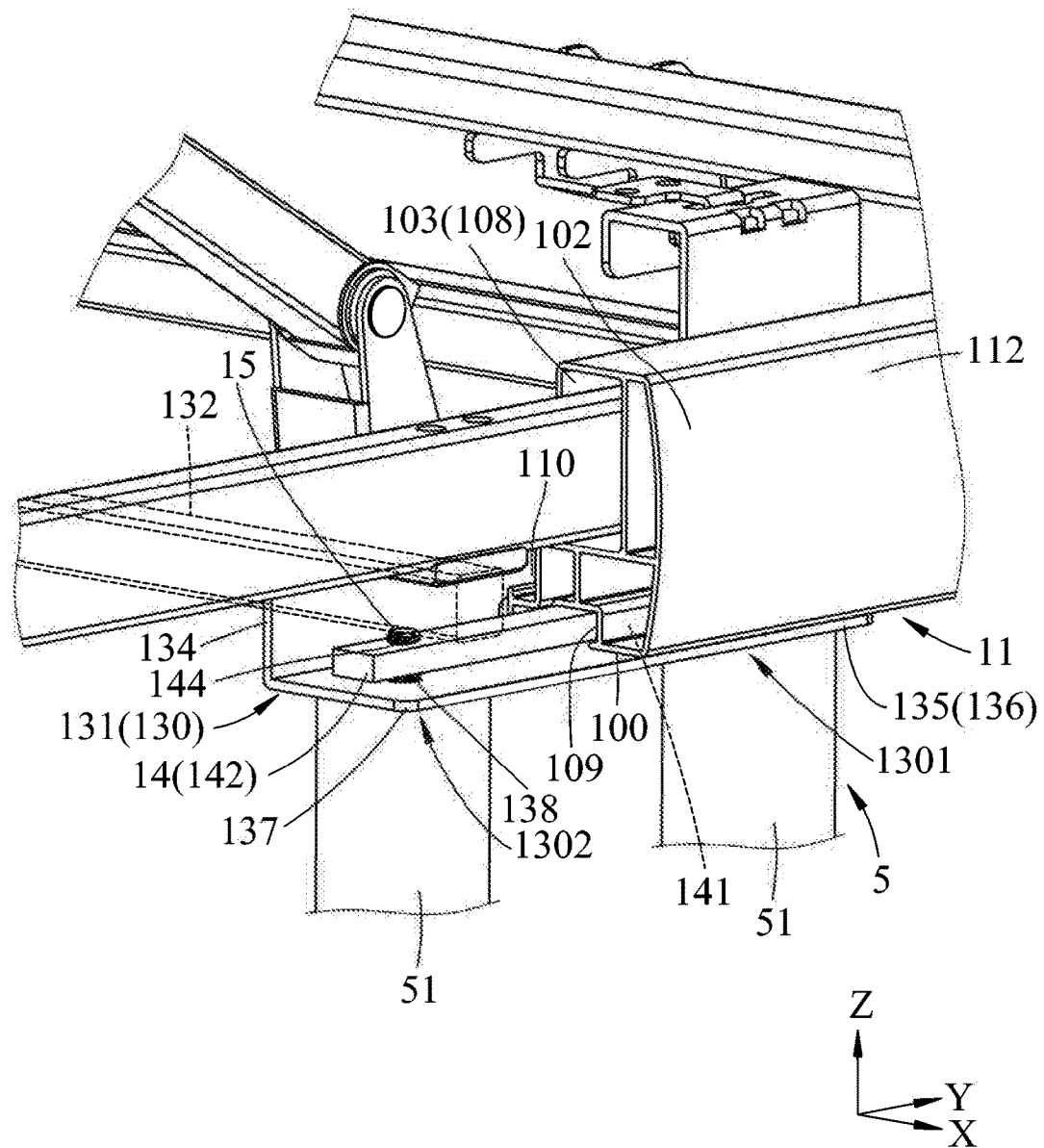
FIG. 5 is a fragmentary enlarged view of a right coupler member of the modular bed with omission of a rear right beam.

The front frame 11 includes a front left beam 111, a front right beam 112, and a front transverse beam 113. Each of the front left and right beams 111, 112 extends in a direction (Y) of a longitudinal axis (L1) to terminate at a front end 101 and a first connected end 102, and has an elongated groove 103 extending in the longitudinal direction (Y) (see FIG. 5). The front left and right beams 111, 112 are spaced apart from each other in a transverse direction (X) relative to the longitudinal direction (Y). The front transverse beam 113 extends to interconnect the front ends 101 of the front left and right beams 111, 112.

Figure 7:
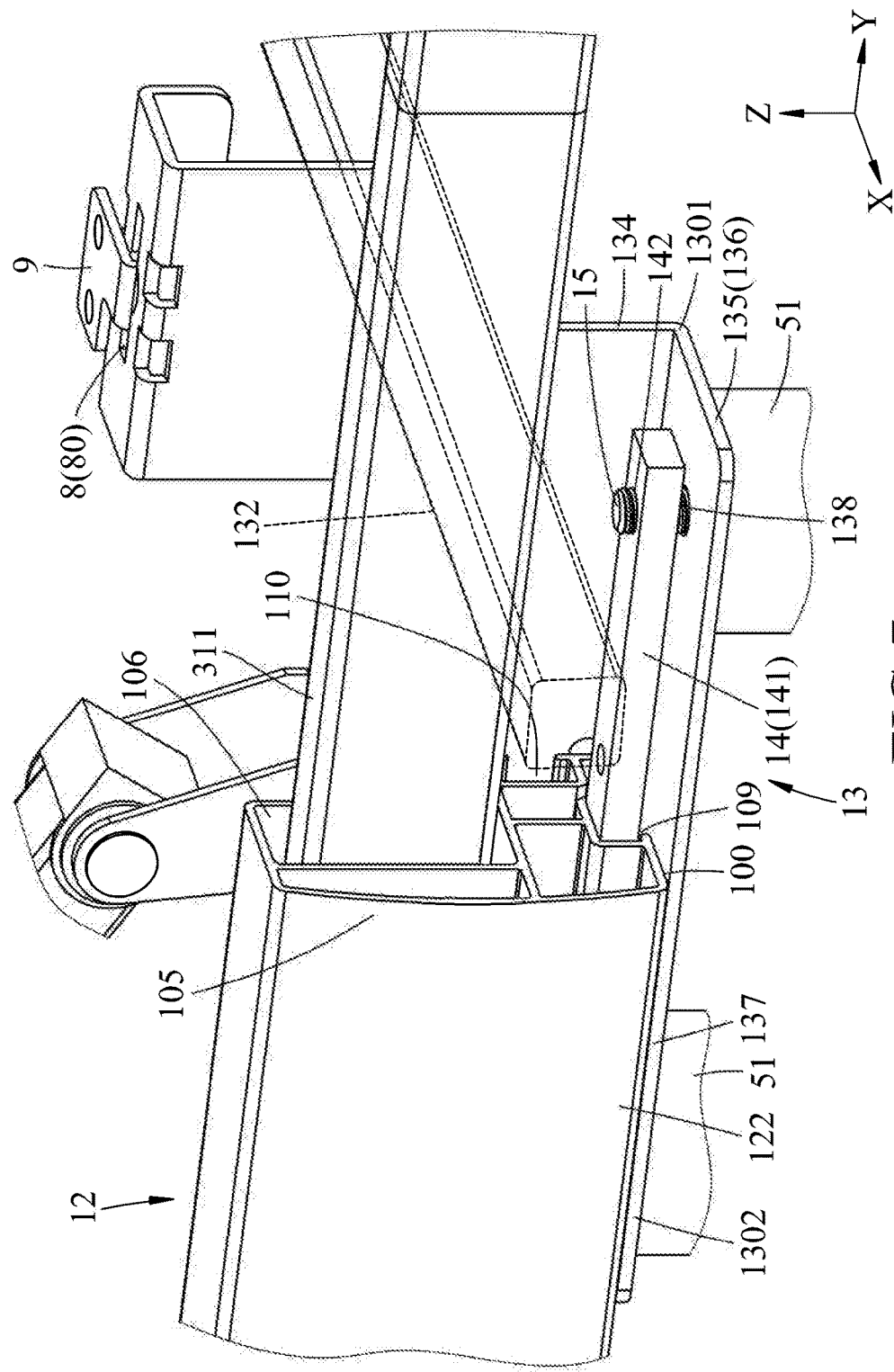
FIG. 7 is a fragmentary enlarged view of a right coupler member of the modular bed with omission of a front right beam.

The rear frame 12 includes a rear left beam 121, a rear right beam 122, and a rear transverse beam 123. Each of the rear left and right beams 121, 122 extends in the longitudinal direction (Y) to terminate at a rear end 104 and a second connected end 105, and has an elongated groove 106 extending in the longitudinal direction (X) (see FIG. 7). The second connected end 105 of each of the rear left and right beams 121, 122 is disposed to confront with the first connected end 102 of a corresponding one of the front left and right beams 111, 112 to permit each of the rear left and right beams 121, 122 to be in-line alignment with a corresponding one of the front left and right beams 111, 112, such that the elongated grooves 103, 106 of the front and rear left beams 111, 121 define a left track 107, and the elongated grooves 103, 106 of the front and rear right beams 112, 122 defines a right track 108. The rear transverse beam 123 extends to interconnect the rear ends 104 of the second left and right beams 121, 122.

In this embodiment, each of the front left and right beams 111, 112 and the rear left and right beams 121, 122 has a lower surface 100 formed with a fitting groove 109, and an inner surface formed with a fitting groove 110. Each of the fitting grooves 109, 110 extends in the longitudinal direction (Y).

In this embodiment, the front left and right beams 111, 112 and the rear left and right beams 121, 122 may be produced using aluminum extrusion processes.

The front support unit 2 includes a front sliding frame 21, a head support frame 22, and a pair of prop links 223.

The front sliding frame 21 includes a pair of front slider bars 211, a mounting bar 213, and a front connecting bar 212.

Each of the front slider bars 211 extends in the longitudinal direction (Y) to terminate at a front proximate end 201 and a front distal end 202 relative to the front transverse beam 113 (see FIG. 3). The front slider bars 211 are configured to be slidably mounted on the left and right tracks 107, 108, respectively.

The mounting bar 213 extends in the transverse direction (X) to interconnect the front proximate ends 201 of the front slider bars 21 so as to permit the front slider bars 21 to move with the mounting bar 213 along the left and right tracks 107, 108, respectively. The mounting bar 213 is movable along the longitudinal direction (Y) so as to permit the first sliding frame 21 to move between a front position (FIG. 3) and a rear position (FIG. 2).

The front connecting bar 212 extends in the transverse direction (X) to interconnect the front distal ends 202 of the front sliding bars 211 so as to move with the front slider bars 211.

The head support frame 22 includes a pair of head support links 221 and a front crossbar 222. Each of the head support links 221 extends along a front lengthwise line (L2), and has a front pivot end 203 and a front coupling end 204 opposite to the front pivot end 203. The front pivot end 203 is pivotally mounted on the mounting bar 213 in proximity to a corresponding one of the front slider bars 211. The front cross bar 222 extends in the transverse direction (X), and is configured to interconnect the front coupling ends 204 of the head support links 221 so as to permit the head support links 221 to angularly move with the front cross bar 222 such that the head support frame 22 is turnable between a head normal position, where the front lengthwise line (L2) is substantially parallel to the longitudinal axis (L1) (FIG. 2), and a head elevated position, where the front lengthwise line (L2) intersects with the longitudinal axis (L1) to form an included angle (FIG. 3).

As best shown in FIG. 3, each of the prop links 223 has a first end 205 and a second end 206. The first end 205 is pivotally mounted to the front frame 11 at or in proximity to the front transverse beam 113. The second end 206 is pivotally mounted to a corresponding one of the head support links 221. When the head support frame 22 is displaced to the head elevated position (FIG. 3) from the head normal position (FIG. 2), the front sliding frame 21 is displaced to the front position from the rear position.

The rear support unit 3 includes a rear sliding frame 31 and a leg support frame 30.

The rear sliding frame 31 includes a pair of rear slider bars 311, a rear connecting bar 312, a rear trailing bar 313, and a rear leading bar 314.

Each of the rear slider bars 311 has a rear proximate end segment 301 (shown in FIG. 2) and a rear distal end segment 302 (shown in FIG. 3) opposite to each other in the longitudinal direction (Y). The rear slider bars 311 are configured to be slidably mounted on the left and right tracks 107, 108, respectively.

The rear connecting bar 312 extends in the transverse direction (X) to interconnect the rear proximate end segments 301 of the rear slider bars 311 so as to move therewith. The rear connecting bar 312 is configured to be secured to the front connecting bar 212 so as to permit the rear sliding frame 31 to move with the front sliding frame 21 along the longitudinal direction (Y). In this embodiment, as shown in FIG. 3, the rear connecting bar 312 is secured to the front connecting bar 212 by two fasteners 19.

The rear trailing bar 313 extends in the transverse direction (X) to interconnect the rear distal end segments 302 of the rear slider bars 311.

The rear leading bar 314 extends in the transverse direction (X) to interconnect the rear sliding bars 311, and is disposed between the rear connecting bar 312 and the rear trailing bar 313.

The leg support frame 30 includes a left linkage 33, a right linkage 34, and a transverse coupling bar 35.

The left linkage 33 includes a first left link 331, a second left link 332, and a left coupling bar 333.

Each of the first and second left links 331, 332 extends along a left lengthwise line (L3), and has a left coupling end 303 and a left pivot end 304. The left pivot end 304 is opposite to the left coupling end 303, and is pivotally mounted on a corresponding one of the rear leading bar 314 and the rear trailing bar 313.

The left coupling bar 333 interconnects the left coupling ends 303 of the first and second left links 331, 332 so as to move with the first and second left links 331, 332.

The right linkage 34 is spaced apart from the left linkage 33 in the transverse direction (X), and includes a first right link 341, a second right link 342, and a right coupling bar 343.

Each of the first and second right links 341, 342 extends along a right lengthwise line (L4), and has a right coupling end 305 and a right pivot end 306. The right pivot end 306 is opposite to the right coupling end 305, and is pivotally mounted on the corresponding one of the rear leading bar 314 and the rear trailing bar 313.

The right coupling bar 343 interconnects the right coupling ends 305 of the first and second right links 341, 342 so as to move with the first and second right links 341, 342.

The transverse coupling bar 35 interconnects the left coupling end 303 of the first left link 331 and the right coupling end 305 of the first right link 341 so as to permit the left and right linkages 33, 34 to move with the transverse coupling bar 35, such that the leg support frame 30 is turnable between a leg normal position, where each of the left and right lengthwise lines (L3, L4) is substantially parallel to the longitudinal axis (L1) (FIG. 2), and a leg elevated position, where each of the left and right lengthwise lines (L3, L4) intersects with the longitudinal axis (L1) to form an included angle (FIG. 3).

In this embodiment, the modular bed further includes a front jack member 26 and a rear jack member 38.

The front jack member 26 has a front rest end 261 coupled to the front cross bar 222, and a front pivoted end 262 pivotally mounted to the mounting bar 213 so as to permit the head support frame 22 to be driven to move between the head normal position (FIG. 2) and the head elevated position (FIG. 3).

The rear jack member 38 has a rear rest end 381 coupled to the transverse coupling bar 35, and a rear pivoted end 382 pivotally mounted to the rear leading bar 314 so as to permit the leg support frame 30 to be driven to move between the leg normal position (FIG. 2) and the leg elevated position (FIG. 3).

As shown in FIG. 1, the modular bed further includes a leg assembly 5 and a middle coupler unit 13.

The leg assembly 5 is configured to elevate and secure the front and rear frames 11, 12 in a stationary state, and includes a plurality of legs 51 each extending in an upright direction (Z).

The middle coupler unit 13 is configured to couple the front frame 11 with the rear frame 12, and includes a left coupler member 131, a right coupler member, and a connecting rod 132 interconnecting the left and right coupler members 131, 133. Each of the left and right coupler members 131, 133 has a front segment 1301 and a rear segment 1302 (see FIGS. 5 and 7). The front segment 1301 is mounted to the first connecting end 102 of a corresponding one of the front left and right beams 111, 112. The rear segment 1302 is mounted to the second connecting end 105 of a corresponding one of the rear left and right beams 121, 122.

In this embodiment, the middle coupler unit 13 includes a pair of middle interconnecting bars 14, a pair of middle angle irons 130, the connecting rod 132, and four middle male threaded members 15.

Each of the middle interconnecting bars 14 has a front half 141 and a rear half 143. The front half 141 has a middle female threaded hole 142 and is configured to be fitted into the fitting groove 109 of a corresponding one of the front left beam 111 and the front right beam 112. The rear half 143 has a middle female threaded hole 144 and is configured to be fitted into the fitting groove 109 of a corresponding one of the rear left beam 121 and the rear right beam 122.

The middle angle irons 130 serve as the left and right coupler members 131, 133, respectively. Each of the middle angle irons 130 has a vertical arm 134 and a horizontal arm 135. The horizontal arm 135 has a front area 136 and a rear area 137. Each of the front and rear areas 136, 137 of the middle angle irons 130 has a middle through bore 138 disposed to be in registration with the middle female threaded hole 142 or 144 of a corresponding one of the front and rear halves 141, 143 of the middle interconnecting bars 14. Four middle ones of the legs 51 are disposed beneath the front and rear areas 136, 137 of the middle angle irons 130, respectively.

The connecting rod 132 interconnects the vertical arms 134 of the middle angle irons 130.

Each of the middle male threaded members 15 is formed in and extends upwardly from a top surface of a corresponding one of the four middle ones of the legs 51, and is configured to be led through the corresponding middle through bore 138, and to be brought into threaded engagement with the corresponding middle female threaded hole 142 or 144, to thereby ensure rigidity of interconnection between the front and rear frames 11, 12.

To more firmly secure the middle angle irons 130 with the front and rear frames 11, 12, each of front and rear areas of the vertical arms 134 of the middle angle irons 130 may be secured to a corresponding one of the first and second connecting ends 102, 105 of the front left and right beams 111, 112 and the rear left and right beams 121, 122 using two additional middle interconnecting bars (not shown) and four additional middle male threaded members (not shown). In details, each of the additional middle interconnecting bars has two halves which are configured to be respectively inserted into the fitting grooves 110 of the front and rear left beams 111, 121 or the front and rear right beams 112, 122. Each of the additional middle male threaded members extends through the corresponding one of the front and rear areas of the vertical arms 134 to be brought into threaded engagement with a corresponding one of the halves of the additional middle interconnecting bars.

Figure 8:
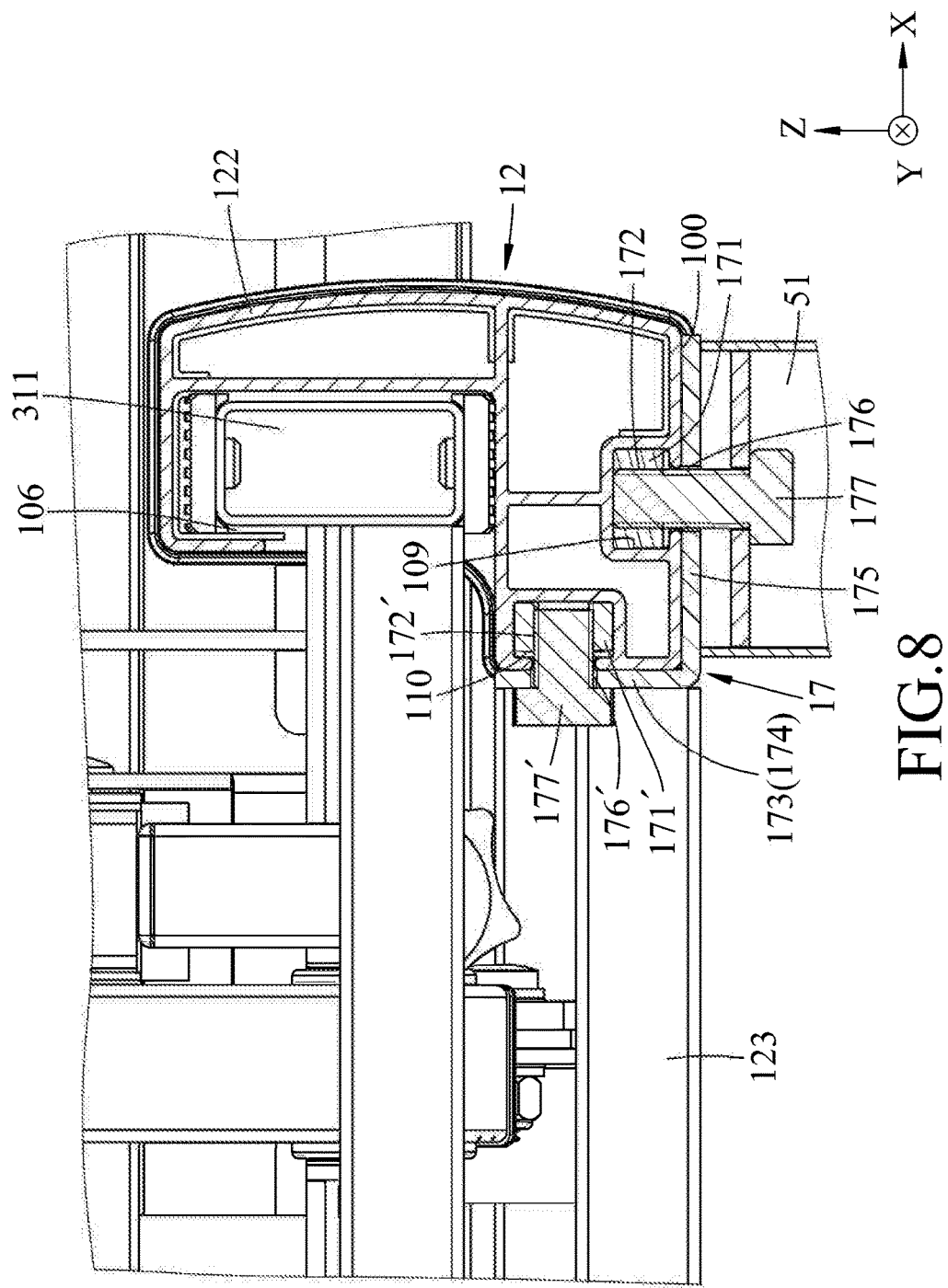
FIG. 8 is a cross-sectional view taken along line VIII-VIII of FIG. 4.
Figure 10:
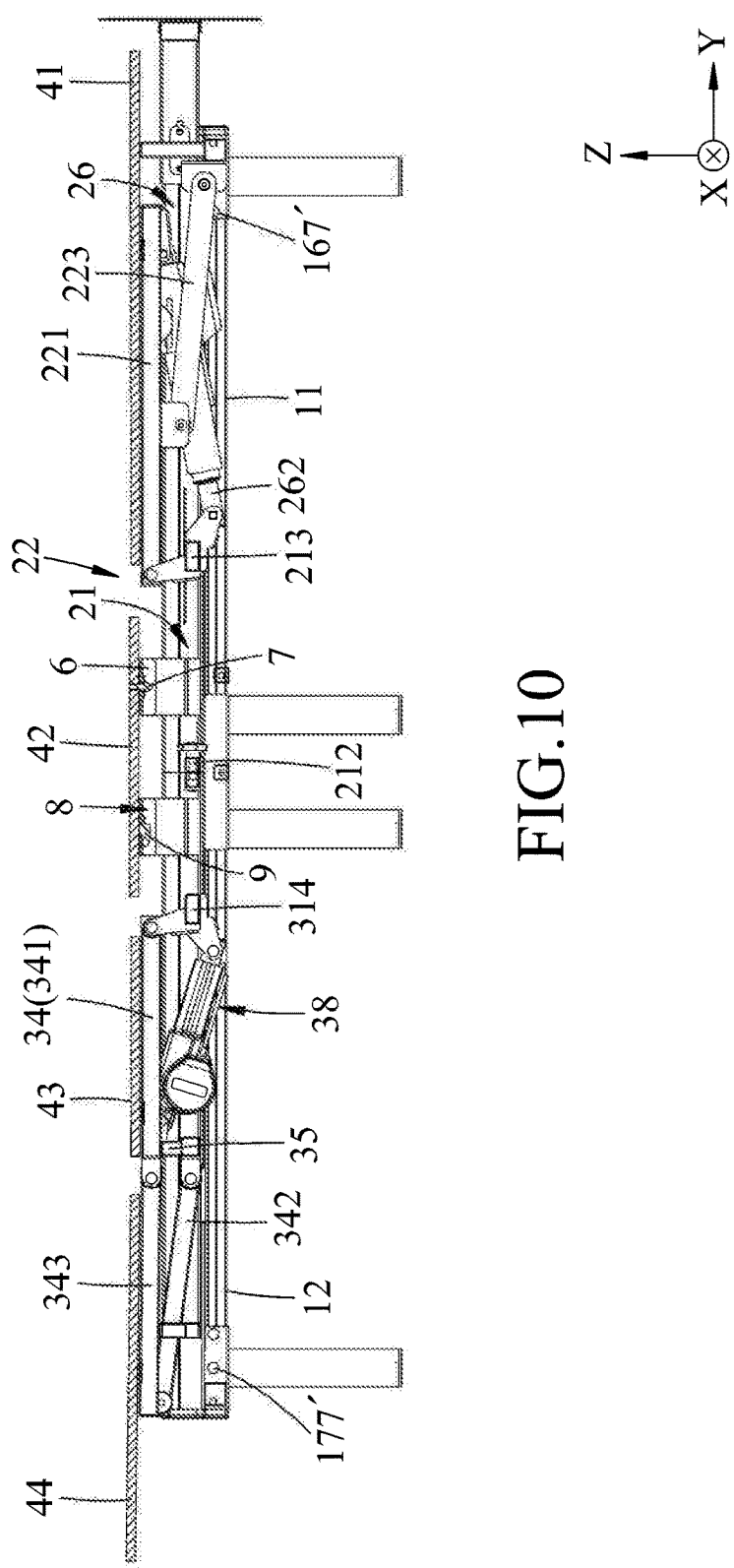
FIG. 10 is a cross-sectional view taken along line X-X of FIG. 4.
Figure 11:
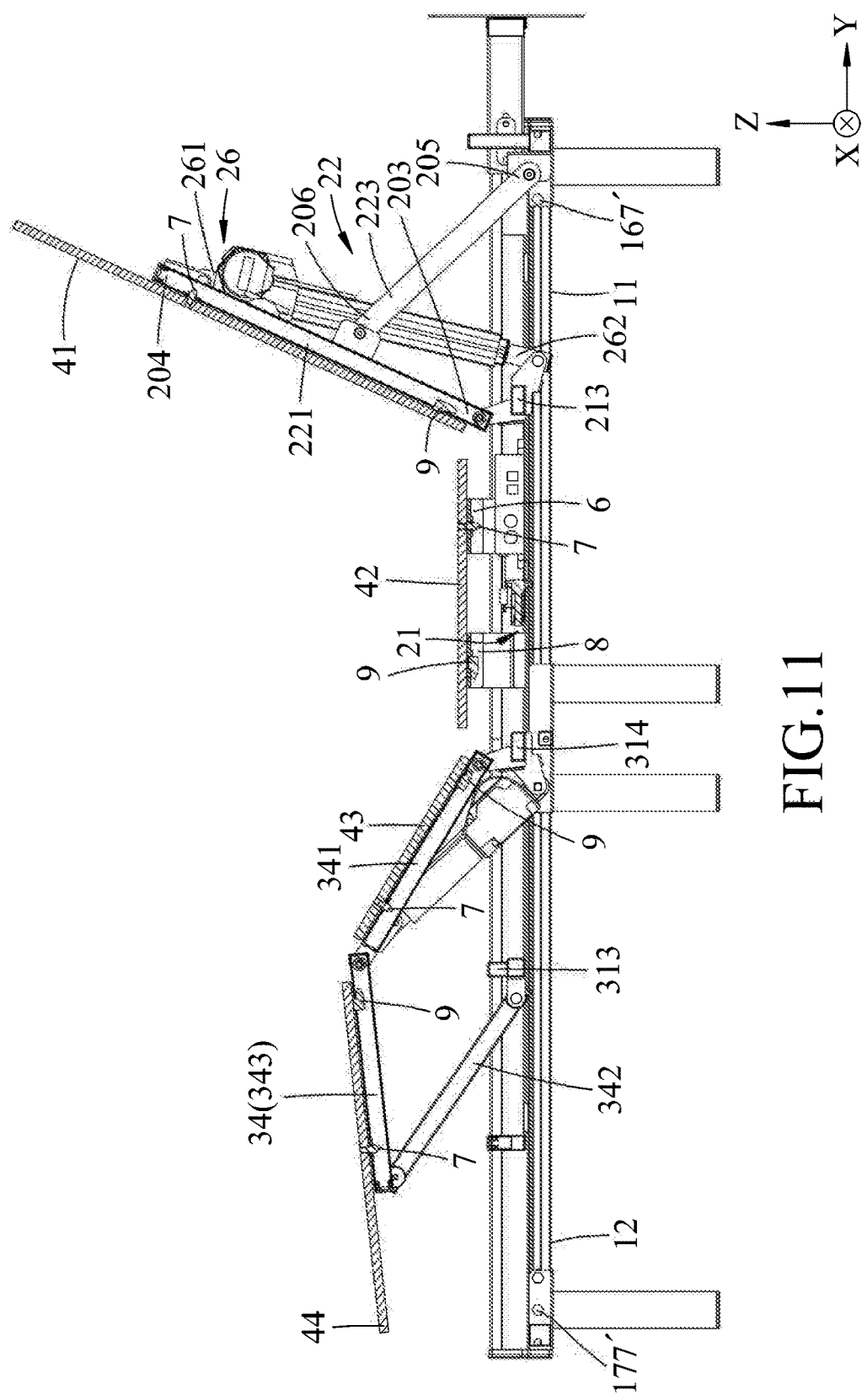
FIG. 11 is similar to FIG. 10 but illustrating the head support frame in the head elevated position and the leg support frame in the leg elevated position.

In this embodiment, the modular bed further includes a front coupler unit 16 (FIG. 6) and a rear coupler unit 17 (FIG. 8).

Figure 6:
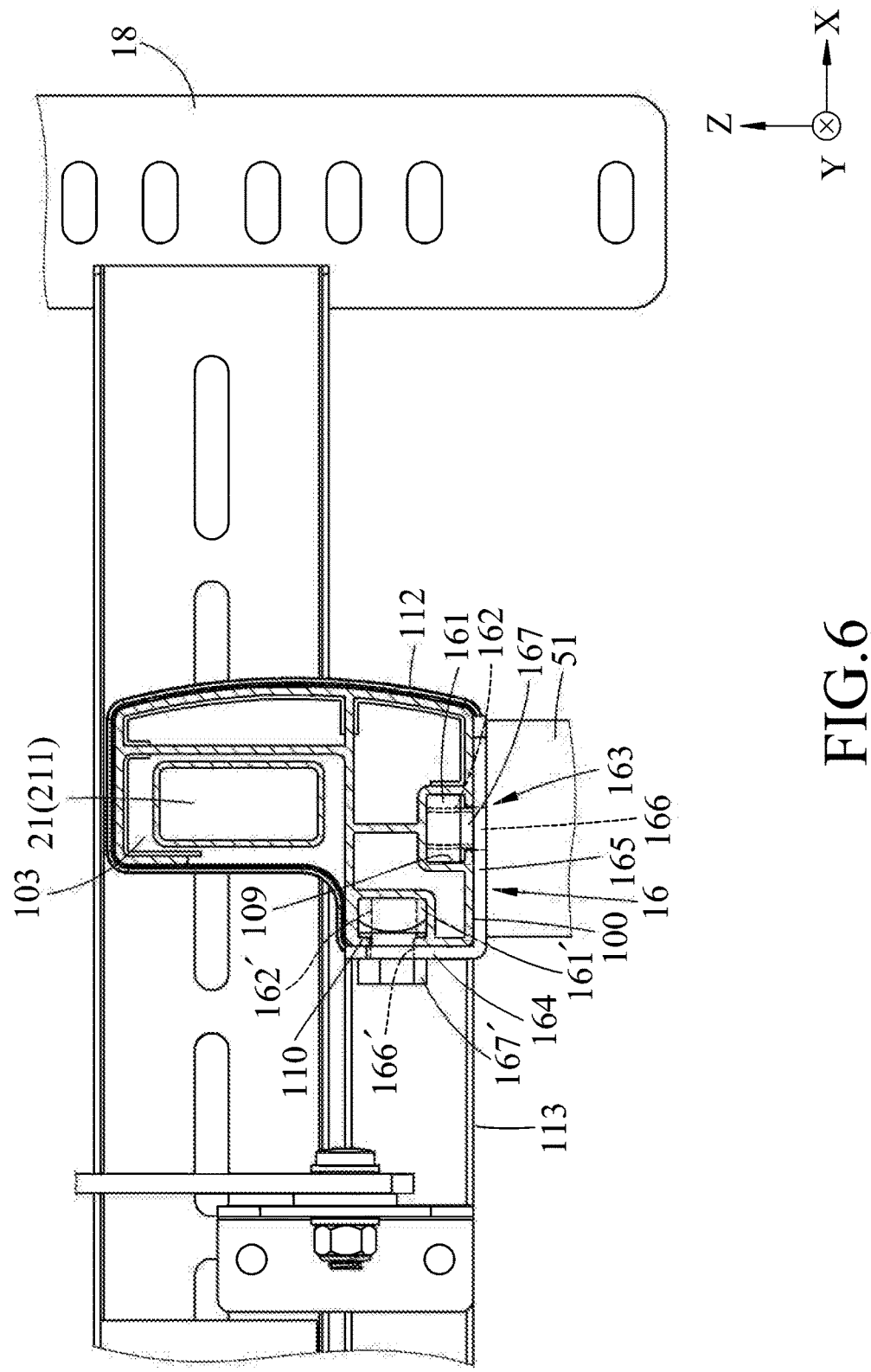
FIG. 6 is a cross-sectional view taken along line VI-VI of FIG. 4.

The front coupler unit 16 is configured to couple two ends of the front transverse beam 113 to the front ends 101 of the front left and right beams 111, 112, and includes a pair of front interconnecting bars 161 (only one is shown in FIG. 6), a pair of front angle irons 163 (only one is shown), and a pair of front male threaded members 167 (only one is shown).

Figure 4:
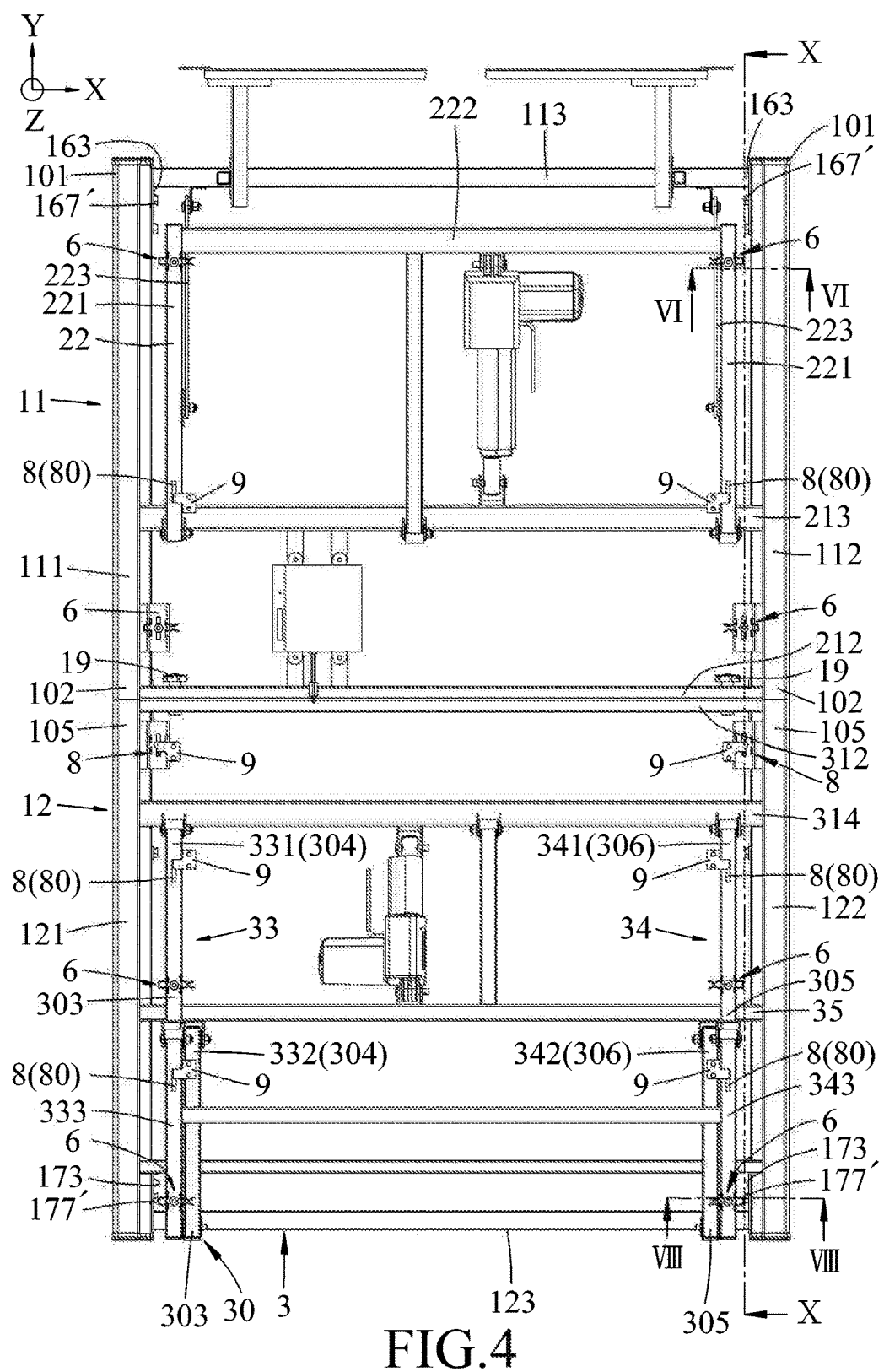
FIG. 4 is a top view of the modular bed shown in FIG. 2.

Each of the front interconnecting bars 161 has a front female threaded hole 162, and is configured to be fitted into the fitting groove 109 in proximity to the front end 101 of a corresponding one of the front left beam 111 and the front right beam 112 (see FIGS. 4 and 6).

Each of the front angle irons 163 has a vertical arm 164 and a horizontal arm 165. The vertical arm 164 is secured to a corresponding one of the two ends of the front transverse beam 113. The horizontal arm 165 has a front through bore 166 disposed to be in register with the front female threaded hole 162 of a corresponding one of the front interconnecting bars 161. Two front ones of the legs 51 are disposed beneath the horizontal arms 165 of the front angle irons 163, respectively.

Each of the front male threaded members 167 is formed in and extends upwardly from a top surface of a corresponding one of the two front ones of the legs 51, and is configured to be led through the corresponding front through bore 166, and to be brought into threaded engagement with the corresponding front female threaded hole 162, to thereby ensure rigidity of interconnection between the front left and right beams 111, 112.

As shown in FIG. 6, the front coupler unit 16 further includes a pair of additional front interconnecting bars 161' (only one is shown) and a pair of additional front male threaded members 167' (only one is shown).

Each of the additional front interconnecting bars 161' is configured to be fitted into the fitting groove 110 in proximity to the front end 101 of the corresponding one of the front left beam 111 and the front right beam 112 (see FIGS. 4 and 6).

Each of the additional front male threaded members 167' is configured to be led through an additional front through bore 166' of the corresponding vertical arm 164, and to be brought into threaded engagement with an additional front female threaded hole 162' of the corresponding additional front interconnecting bar 161'.

The rear coupler unit 17 is configured to couple two ends of the rear transverse beam 123 to the rear ends 104 of the rear left and right beams 121, 122, and includes a pair of rear interconnecting bars 171, a pair of rear angle irons 173, and a pair of rear male threaded members 177.

Each of the rear interconnecting bars 171 has a rear female threaded hole 172, and is configured to be fitted into the fitting groove 109 in proximity to the rear end 104 of a corresponding one of the rear left beam 121 and the rear right beam 122 (see FIGS. 4 and 8).

Each of the rear angle irons 173 has a vertical arm 174 and a horizontal arm 175. The vertical arm 174 is secured to a corresponding one of the two ends of the rear transverse beam 123. The horizontal arm 175 has a rear through bore 176 disposed to be in register with the rear female threaded hole 172 of a corresponding one of the rear interconnecting bars 171. Two rear ones of the legs 51 are disposed beneath the horizontal arms 175 of the rear angle irons 173, respectively.

Each of the rear male threaded members 177 is formed in and extends upwardly from a top surface of a corresponding one of the two rear ones of the legs 51, and is configured to be led through the corresponding rear through bore 176, and to be brought into threaded engagement with the corresponding rear female threaded hole 172, to thereby ensure rigidity of interconnection between the rear left and right beams 121, 122.

As shown in FIG. 8, the rear coupler unit 17 further includes a pair of additional rear interconnecting bars 171' (only one is shown) and a pair of additional rear male threaded members 177' (only one is shown).

Each of the additional rear interconnecting bars 171' is configured to be fitted into the fitting groove 110 in proximity to the rear end 104 of the corresponding one of the rear left beam 121 and the rear right beam 122 (see FIGS. 4 and 8).

Each of the additional rear male threaded members 177' is configured to be led through an additional rear through bore 176' of the corresponding vertical arm 174, and to be brought into threaded engagement with an additional rear female threaded hole 172' of the corresponding additional rear interconnecting bar 171'.

In this embodiment, the modular bed further includes a bed panel assembly 4, four pairs of socket units 6, and four pairs of plug members 7.

The bed panel assembly 4 includes a front panel unit 401 and a rear panel unit 402. The front panel unit 401 includes a head support panel 41 and a lower-trunk support panel 42. The rear panel unit 402 includes a thigh support panel 43 and a leg support panel 44.

A first pair of the socket units 6 are respectively secured to the head support links 221, a second pair of the socket units 6 are respectively secured to the front slider bars 211, a third pair of the socket units 6 are respectively secured to the first left and right links 331, 341, and a fourth pair of the socket units 6 are respectively secured to the left and right coupling bars 333, 343. As shown in FIG. 9, each of the socket units 6 includes a faceplate 61, a left strip 62, a right strip 63, a left slot 64, a right slot 65, a left spacer 66, a right spacer 67, and a bent wire spring 68.

The faceplate 61 is formed with a socket hole 610. In this embodiment, as shown in FIGS. 2, 3, and 9, each of the faceplates 61 of the first, third, and fourth pairs of the socket units 6 is integrally formed with a corresponding one of the head support links 221, the first left and right links 331, 341, and the left and right coupling bars 333, 343.

The left and right strips 62, 63 extend inwardly from left and right lateral edges 611, 612 of the faceplate 61, respectively.

The left slot 64 is formed in the left strip 62 and extends beyond the left lateral edge 611 of the faceplate 61. The right slot 65 is formed in the right strip 63 and extends beyond the right lateral edge 612 of the faceplate 61. The left and right slots 64, 65 are at opposite sides of the socket hole 610.

The left and right spacers 66, 67 are disposed at opposite sides of the socket hole 610. Each of the left and right spacers 66, 67 is configured to span between the faceplate 61 and a corresponding one of the left and right strips 62, 63 so as to divide a corresponding one of the left and right slots 64, 65 into two sub-slots 601, 602. Each of the left and right spacers 66, 67 has a width (W1) smaller than a diameter (D) of the socket hole 610.

The bent wire spring 68 includes a bent segment 681 which has two junctures 682, and two arm segments 683 which are formed by bending at the two junctures 682 so as to acquire a biasing force that biases the two arm segments 683 toward each other. The two arm segments 683, upon being led through the left and right slots 64, 65, are forced to be spaced apart by the left and right spacers 66, 67 so as to form a gripping gap 680 with a predetermined width (W2) that is in the socket hole 610.

Figure 12:
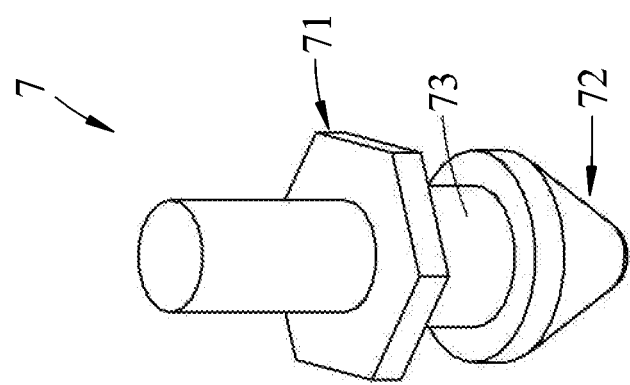
FIG. 12 is a perspective view of two plug members of FIGS. 1 and 11.
Figure 12:
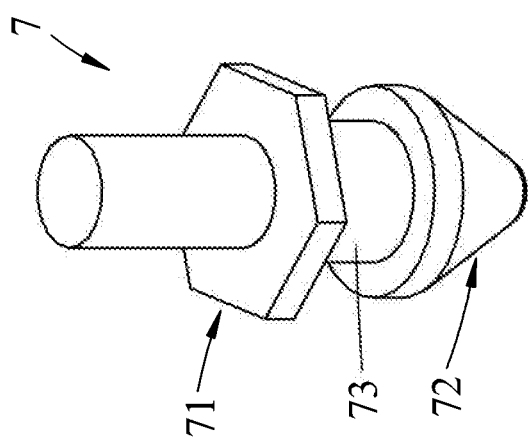

A first pair of the plug members 7 are secured to a bottom surface of the head support panel 41 to be in register with the first pair of the socket units 6, respectively. A second pair of the plug members 7 are secured to a bottom surface of the lower-trunk support panel 42 to be in register with the second pair of the socket units 6, respectively. A third pair of the plug members 7 are secured to a bottom surface of the thigh support panel 43 to be in register with the third pair of the socket units 6, respectively. A fourth pair of the plug members 7 are secured to a bottom surface of the leg support panel 44 to be in register with the fourth pair of the socket units 6, respectively. As shown in FIG. 12, each of the plug members 7 has a base segment 71, a guiding head segment 72, and a neck segment 73.

The base segment 71 is configured to be secured to the bottom surface of a corresponding one of the head support panel 41, the lower-trunk support panel 42, the thigh support panel 43, and the leg support panel 44.

The guiding head segment 72 is opposite to the base segment 71, and is insertable through the corresponding socket hole 610. The guiding head segment 72 is configured to be forced into and through the corresponding gripping gap 680 against the biasing force between the arm segments 683 of the corresponding bent wire spring 68.

The neck segment 73 is disposed between the base segment 71 and the guiding head segment 72, and is configured such that when the guiding head segment 72 is forced into and through the corresponding gripping gap 680, the neck segment 73 is brought into snug engagement with the arm segments 683 of the corresponding bent wire spring 68 by virtue of the biasing force.

In this embodiment, the modular bed further includes four pairs of first joining members 8 and four pairs of second joining members 9.

A first pair of the first joining members 8 are respectively secured to the head support links 221. A second pair of the first joining members 8 are respectively secured to the rear slider bars 311. A third pair of the first joining members 8 are respectively secured to the first left and right links 331, 341. A fourth pair of the first joining members 8 are respectively secured to the left and right coupling bars 333, 343. Each of the first joining members 8 has a slot 80. As shown in FIGS. 2 to 4, each of the first, third, and fourth pairs of the first joining members 8 is integrally formed with a corresponding one of the head support links 221, the first left and right links 331, 341, and the left and right coupling bars 333, 343.

Figure 13:
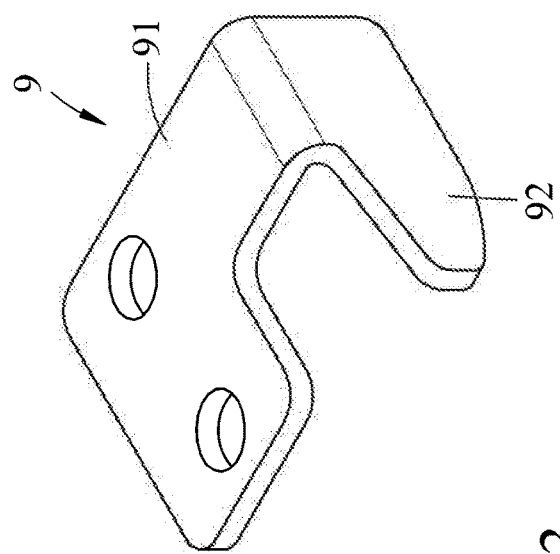
FIG. 13 is a perspective view of two joining members of FIGS. 1 and 11.
Figure 13:
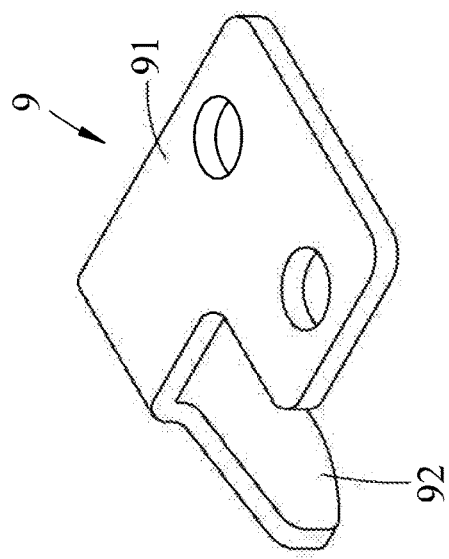

A first pair of the second joining members 9 are secured to the bottom surface of the head support panel 41 to be mated with the first pair of the first joining members 8, respectively. A second pair of the second joining members 9 are secured to the bottom surface of the lower-trunk support panel 42 to be mated with the second pair of the first joining members 8, respectively. A third pair of the second joining members 9 are secured to the bottom surface of the thigh support panel 43 to be mated with the third pair of the first joining members 8, respectively. A fourth pair of the second joining members 9 are secured to the bottom surface of the leg support panel 44 to be mated with the fourth pair of the first joining members 8, respectively. As shown in FIG. 13, each of the second joining members 9 has a base 91 configured to be secured to the corresponding bottom surface, and a hook 92 configured to interlock with the corresponding slot 80.

Furthermore, as shown in FIGS. 1 and 2, the modular bed may further includes two spacer frames 18 each of which is disposed to permit the front frame 11 to be spaced apart from a wall (not shown), and each of which has a front segment 181 configured to be secured to the wall, and a rear segment 182 extending in the longitudinal direction (Y) to terminate a rear end 183 that is configured to be secured to the front transverse beam 113.

Moreover, as shown in FIG. 1, the modular bed may further includes two pair of massage vibration rollers (vibration motors) 45, a first pair of which are mounted in the head support panel 41, and a second pair of which are mounted in the leg support panel 44.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A modular bed comprising:
   a bed frame unit including
      a front frame including a front left beam and a front right beam which extend in a direction of a longitudinal axis, respectively, and which are spaced apart from each other in a transverse direction relative to the longitudinal direction, each of said front left and right beams having a first connected end, and
      a rear frame including a rear left beam and a rear right beam which extend in the longitudinal direction, respectively, and which are spaced apart from each other in the transverse direction, each of said rear left and right beams having a second connected end which is disposed to confront with said first connected end of a corresponding one of said front left and right beams to permit each of said rear left and right beams to be in-line alignment with a corresponding one of said front left and right beams;
   a middle coupler unit which is configured to couple said front frame with said rear frame, and which includes a left coupler member, a right coupler member, a connecting rod interconnecting said left and right coupler members, each of said left and right coupler members having
      a front segment mounted to said first connecting end of a corresponding one of said front left and right beams, and
      a rear segment mounted to said second connecting end of a corresponding one of said rear left and right beams; and
   a leg assembly configured to elevate and secure said front and rear frames in a stationary state, and including a plurality of legs,
   wherein:
   each of said front left and right beams has a front end opposite to said first connected end in the longitudinal direction;
   said front frame further includes a front transverse beam extending to interconnect said front ends of said front left and right beams;
   each of said rear left and right beams has a rear end opposite to said second connected end in the longitudinal direction;
   said rear frame further includes a rear transverse beam extending to interconnect said rear ends of said second left and right beams;
   each of said front left and right beams and said rear left and right beams has a lower surface formed with a fitting groove which extends in the longitudinal direction; and
   said middle coupler unit includes:
      a pair of middle interconnecting bars each having:
         a front half which has a middle female threaded hole and which is configured to be fitted into said fitting groove of a corresponding one of said front left beam and said front right beam, and
         a rear half which has a middle female threaded hole and which is configured to be fitted into said fitting groove of a corresponding one of said rear left beam and said rear right beam,
      a pair of middle angle irons which serve as said left and right coupler members, respectively, each of said middle angle irons having a vertical arm, and a horizontal arm with a front area and a rear area, each of said front and rear areas of said middle angle irons having a middle through bore disposed to be in registration with said middle female threaded hole of a corresponding one of said front and rear halves of said middle interconnecting bars, four middle ones of said legs being disposed beneath said front and rear areas of said middle angle irons, respectively, said connecting rod interconnecting said vertical arms of said middle angle irons, and
      four middle male threaded members each of which is formed in and extends upwardly from a top surface of a corresponding one of said four middle ones of said legs, and each of which is configured to be led through said corresponding middle through bore, and to be brought into threaded engagement with said corresponding middle female threaded hole, to thereby ensure rigidity of interconnection between said front and rear frames.

2. The modular bed according to claim 1, wherein each of said front left and right beams has an elongated groove extending in the longitudinal direction, and each of said rear left and right beams has an elongated groove which extends in the longitudinal direction, and which is configured such that when each of said rear left and right beams is in-line alignment with a corresponding one of said front left and right beams, said elongated grooves of said front and rear left beams define a left track, and said elongated grooves of said front and rear right beams defines a right track, said modular bed further comprising:
   a front sliding frame including
      a pair of front slider bars each extending in the longitudinal direction to terminate at a front proximate end and a front distal end relative to said front transverse beam, said front slider bars being configured to be slidably mounted on said left and right tracks, respectively,
      a mounting bar extending in the transverse direction to interconnect said front proximate ends of said front slider bars so as to permit said front slider bars to move with said mounting bar along the left and right tracks, respectively, said mounting bar being movable along the longitudinal direction so as to permit said first sliding frame to move between a front position and a rear position, and
      a front connecting bar extending in the transverse direction to interconnect said front distal ends of said front sliding bars so as to move with said front slider bars;
   a rear sliding frame including
      a pair of rear slider bars each having a rear proximate end segment and a rear distal end segment opposite to each other in the longitudinal direction, said rear slider bars being configured to be slidably mounted on said left and right tracks, respectively, a rear connecting bar extending in the transverse direction to interconnect said rear proximate end segments of said rear slider bars so as to move therewith, said rear connecting bar being configured to be secured to said front connecting bar so as to permit said rear sliding frame to move with said front sliding frame along the longitudinal direction, a rear trailing bar extending in the transverse direction to interconnect said rear distal end segments of said rear slider bars, and a rear leading bar which extends in the transverse direction to interconnect said rear sliding bars, and which is disposed between said rear connecting bar and said rear trailing bar;

a head support frame including a pair of head support links each extending along a front lengthwise line, and each having a front pivot end mounted pivotally on said mounting bar in proximity to a corresponding one of said front slider bars, and a front coupling end opposite to said front pivot end, and a front cross bar which extends in the transverse direction, and which is configured to interconnect said front coupling ends of said head support links so as to permit said head support links to angularly move with said front cross bar such that said head support frame is turnable between a head normal position, where the front lengthwise line is substantially parallel to the longitudinal axis, and a head elevated position, where the front lengthwise line intersects with the longitudinal axis to form an included angle;

a pair of prop links each of which has a first end pivotally mounted to said front frame at or in proximity to said front transverse beam, and a second end pivotally mounted to a corresponding one of said head support links such that when said head support frame is displaced to the head elevated position from the head normal position, said front sliding frame is displaced to the front position from the rear position;

a front jack member having a front rest end which is coupled to one of said front cross bar and said mounting bar, and a front pivoted end which is pivotally mounted to the other of said front cross bar and said mounting bar so as to permit said head support frame to be driven to move between the head normal position and the head elevated position;

a leg support frame including a left linkage including a first left link and a second left link each of which extends along a left lengthwise line, and each of which has a left coupling end, and a left pivot end that is opposite to said left coupling end, and that is pivotally mounted on a corresponding one of said rear leading bar and said rear trailing bar, and a left coupling bar interconnecting said left coupling ends of said first and second left links so as to move with said first and second left links, a right linkage which is spaced apart from said left linkage in the transverse direction, and which includes a first right link and a second right link each of which extends along a right lengthwise line, and each of which has a right coupling end, and a right pivot end that is opposite to said right coupling end, and that is pivotally mounted on the corresponding one of said rear leading bar and said rear trailing bar, and a right coupling bar interconnecting said right coupling ends of said first and second right links so as to move with said first and second right links, and a transverse coupling bar interconnecting said left coupling end of said first left link and said right coupling end of said first right link so as to permit said left and right linkages to move with said transverse coupling bar, such that said leg support frame is turnable between a leg normal position, where each of the left and right lengthwise lines is substantially parallel to the longitudinal axis, and a leg elevated position, where each of the left and right lengthwise lines intersects with the longitudinal axis to form an included angle; and a rear jack member having a rear rest end which is coupled to one of said rear leading bar and said transverse coupling bar, and a rear pivoted end which is pivotally mounted to the other of said rear leading bar and said transverse coupling bar so as to permit said leg support frame to be driven to move between the leg normal position and the leg elevated position.

3. The modular bed according to claim 2, further comprising:

a front coupler unit which is configured to couple two ends of said front transverse beam to said front ends of said front left and right beams, and which includes a pair of front interconnecting bars each of which has a front female threaded hole, and each of which is configured to be fitted into said fitting groove in proximity to said front end of a corresponding one of said front left beam and said front right beam, a pair of front angle irons each having a vertical arm which is secured to a corresponding one of said two ends of said front transverse beam, and a horizontal arm which has a front through bore disposed to be in register with said front female threaded hole of a corresponding one of said front interconnecting bars, two front ones of said legs being disposed beneath said horizontal arms of said front angle irons, respectively, and a pair of front male threaded members each of which is formed in and extends upwardly from a top surface of a corresponding one of said two front ones of said legs, and each of which is configured to be led through said corresponding front through bore, and to be brought into threaded engagement with said corresponding front female threaded hole, to thereby ensure rigidity of interconnection between said front left and right beams; and a rear coupler unit which is configured to couple two ends of said rear transverse beam to said rear ends of said rear left and right beams, and which includes a pair of rear interconnecting bars each of which has a rear female threaded hole, and each of which is configured to be fitted into said fitting groove in proximity to said rear end of a corresponding one of said rear left beam and said rear right beam, a pair of rear angle irons each having a vertical arm which is secured to a corresponding one of said two ends of said rear transverse beam, and a horizontal arm which has a rear through bore disposed to be in register with said rear female threaded hole of a corresponding one of said rear interconnecting bars, two rear ones of said legs being disposed beneath said horizontal arms of said rear angle irons, respectively, and a pair of rear male threaded members each of which is formed in and extends upwardly from a top surface of a corresponding one of said two rear ones of said legs, and each of which is configured to be led through said corresponding rear through bore, and to be brought into threaded engagement with said corresponding rear female threaded hole, to thereby ensure rigidity of interconnection between said rear left and right beams.

4. The modular bed according to claim 2, further comprising:

a bed panel assembly including a head support panel, a lower-trunk support panel, a thigh support panel, and a leg support panel;

four pairs of socket units, a first pair of which are respectively secured to said head support links, a second pair of which are respectively secured to said front slider bars, a third pair of which are respectively secured to said first left and right links, and a fourth pair of which are respectively secured to said left and right coupling bars, each of said socket units including a faceplate formed with a socket hole, a left strip and a right strip which extend inwardly from left and right lateral edges of said faceplate, respectively, a left slot formed in said left strip and extending beyond said left lateral edge of said faceplate, a right slot formed in said right strip and extending beyond said right lateral edge of said faceplate, said left and right slots being at opposite sides of said socket hole, a left spacer and a right spacer which are disposed at opposite sides of said socket hole, each of said left and right spacers being configured to span between said faceplate and a corresponding one of said left and right strips so as to divide a corresponding one of said left and right slots into two sub-slots, each of said left and right spacers having a width smaller than a diameter of said socket hole, and a bent wire spring including a bent segment which has two junctures, and two arm segments which are formed by bending at said two junctures so as to acquire a biasing force that biases said two arm segments toward each other, and which, upon being led through said left and right slots, are forced to be spaced apart by said left and right spacers so as to form a gripping gap with a predetermined width that is in said socket hole;

four pairs of plug members, a first pair of which are secured to a bottom surface of said head support panel to be in register with said first pair of said socket units, respectively, a second pair of which are secured to a bottom surface of said lower-trunk support panel to be in register with said second pair of said socket units, respectively, a third pair of which are secured to a bottom surface of said thigh support panel to be in register with said third pair of said socket units, respectively, and a fourth pair of which are secured to a bottom surface of said leg support panel to be in register with said fourth pair of said socket units, respectively, each of said plug members having a base segment configured to be secured to said bottom surface of a corresponding one of said head support panel, said lower-trunk support panel, said thigh support panel, and said leg support panel, a guiding head segment opposite to said base segment, and insertable through said corresponding socket hole, said guiding head segment being configured to be forced into and through said corresponding gripping gap against the biasing force between said arm segments of said corresponding bent wire spring, and a neck segment which is disposed between said base segment and said guiding head segment, and which is configured such that when said guiding head segment is forced into and through said corresponding gripping gap, said neck segment is brought into snug engagement with said arm segments of said corresponding bent wire spring by virtue of the biasing force.

5. The modular bed according to claim 4, further comprising:

four pairs of first joining members, a first pair of which are respectively secured to said head support links, a second pair of which are respectively secured to said rear slider bars, a third pair of which are respectively secured to said first left and right links, and a fourth pair of which are respectively secured to said left and right coupling bars, each of said first joining members having a slot; and four pairs of second joining members, a first pair of which are secured to said bottom surface of said head support panel to be mated with said first pair of said first joining members, respectively, a second pair of which are secured to said bottom surface of said lower-trunk support panel to be mated with said second pair of said first joining members, respectively, a third pair of which are secured to said bottom surface of said thigh support panel to be mated with said third pair of said first joining members, respectively, and a fourth pair of which are secured to said bottom surface of said leg support panel to be mated with said fourth pair of said first joining members, respectively, each of said second joining members having a hook configured to interlock with said corresponding slot.

6. The modular bed according to claim 2, further comprising a spacer frame which is disposed to permit said front frame to be spaced apart from a wall, and which has a front segment configured to be secured to the wall, and a rear segment extending in the longitudinal direction to terminate a rear end that is configured to be secured to said front transverse beam.

7. A modular bed comprising:

a front frame including a front left beam and a front right beam each of which extends in a direction of a longitudinal axis to terminate at a front end and a first connected end, and each of which has an elongated groove extending in the longitudinal direction, said front left and right beams being spaced apart from each other in a transverse direction relative to the longitudinal direction, and a front transverse beam extending to interconnect said front ends of said front left and right beams;

a rear frame including a rear left beam and a rear right beam each of which extends in the longitudinal direction to terminate at a rear end and a second connected end, and each of which has an elongated groove extending in the longitudinal direction, said second connected end being disposed to confront with said first connected end of a corresponding one of said front left and right beams to permit each of said rear left and right beams to be in-line alignment with a corresponding one of said front left and right beams, such that said elongated grooves of said front and rear left beams define a left track, and said elongated grooves of said front and rear right beams defines a right track, and a rear transverse beam extending to interconnect said rear ends of said second left and right beams;

a front sliding frame including a pair of front slider bars each extending in the longitudinal direction to terminate at a front proximate end and a front distal end relative to said front transverse beam, said front slider bars being configured to be slidably mounted on said left and right tracks, respectively, a mounting bar extending in the transverse direction to interconnect said front proximate ends of said front slider bars so as to permit said front slider bars to move with said mounting bar along the left and right tracks, respectively, said mounting bar being movable along the longitudinal direction so as to permit said first sliding frame to move between a front position and a rear position, and a front connecting bar extending in the transverse direction to interconnect said front distal ends of said front sliding bars so as to move with said front slider bars;

a rear sliding frame including a pair of rear slider bars each having a rear proximate end segment and a rear distal end segment opposite to each other in the longitudinal direction, said rear slider bars being configured to be slidably mounted on said left and right tracks, respectively, a rear connecting bar extending in the transverse direction to interconnect said rear proximate end segments of said rear slider bars so as to move therewith, said rear connecting bar being configured to be secured to said front connecting bar so as to permit said rear sliding frame to move with said front sliding frame along the longitudinal direction, a rear trailing bar extending in the transverse direction to interconnect said rear distal end segments of said rear slider bars, and a rear leading bar which extends in the transverse direction to interconnect said rear sliding bars, and which is disposed between said rear connecting bar and said rear trailing bar;

a head support frame including a pair of head support links each extending along a front lengthwise line, and each having a front pivot end mounted pivotally on said mounting bar in proximity to a corresponding one of said front slider bars, and a front coupling end opposite to said front pivot end, and a front cross bar which extends in the transverse direction, and which is configured to interconnect said front coupling ends of said head support links so as to permit said head support links to angularly move with said front cross bar such that said head support frame is turnable between a head normal position, where the front lengthwise line is substantially parallel to the longitudinal axis, and a head elevated position, where the front lengthwise line intersects with the longitudinal axis to form an included angle;

a pair of prop links each of which has a first end pivotally mounted to said front frame at or in proximity to said front transverse beam, and a second end pivotally mounted to a corresponding one of said head support links such that when said head support frame is displaced to the head elevated position from the head normal position, said front sliding frame is displaced to the front position from the rear position; and a leg support frame including a left linkage including a first left link and a second left link each of which extends along a left lengthwise line, and each of which has a left coupling end, and a left pivot end that is opposite to said left coupling end, and that is pivotally mounted on a corresponding one of said rear leading bar and said rear trailing bar, and a left coupling bar interconnecting said left coupling ends of said first and second left links so as to move with said first and second left links, a right linkage which is spaced apart from said left linkage in the transverse direction, and which includes a first right link and a second right link each of which extends along a right lengthwise line, and each of which has a right coupling end, and a right pivot end that is opposite to said right coupling end, and that is pivotally mounted on the corresponding one of said rear leading bar and said rear trailing bar, and a right coupling bar interconnecting said right coupling ends of said first and second right links so as to move with said first and second right links, and a transverse coupling bar interconnecting said left coupling end of said first left link and said right coupling end of said first right link so as to permit said left and right linkages to move with said transverse coupling bar, such that said leg support frame is turnable between a leg normal position, where each of the left and right lengthwise lines is substantially parallel to the longitudinal axis, and a leg elevated position, where each of the left and right lengthwise lines intersects with the longitudinal axis to form an included angle.

8. The modular bed according to claim 7, further comprising:

a front jack member having a front rest end which is coupled to one of said front cross bar and said mounting bar, and a front pivoted end which is pivotally mounted to the other of said front cross bar and said mounting bar so as to permit said head support frame to be driven to move between the head normal position and the head elevated position; and a rear jack member having a rear rest end which is coupled to one of said rear leading bar and said transverse coupling bar, and a rear pivoted end which is pivotally mounted to the other of said rear leading bar and said transverse coupling bar so as to permit said leg support frame to be driven to move between the leg normal position and the leg elevated position.

9. The modular bed according to claim 7, further comprising a leg assembly configured to elevate and secure said front and rear frames in a stationary state, and including a plurality of legs.

10. The modular bed according to claim 9, wherein each of said front left and right beams and said rear left and right beams has a lower surface formed with a fitting groove which extends in the longitudinal direction, said modular bed further comprising a middle coupler unit which is configured to couple said front frame to said rear frame, and which includes a pair of middle interconnecting bars each having a front half which has a middle female threaded hole and which is configured to be fitted into said fitting groove of a corresponding one of said front left beam and said front right beam, and a rear half which has a middle female threaded hole and which is configured to be fitted into said fitting groove of a corresponding one of said rear left beam and said rear right beam, a pair of middle angle irons each having a vertical arm, and a horizontal arm with a front area and a rear area, each of said front and rear areas of said middle angle irons having a middle through bore disposed to be in registration with said middle female threaded hole of a corresponding one of said front and rear halves of said middle interconnecting bars, four middle ones of said legs being disposed beneath said front and rear areas of said middle angle irons, respectively, a connecting rod interconnecting said vertical arms of said middle angle irons, and four middle male threaded members each of which is formed in and extends upwardly from a top surface of a corresponding one of said four middle ones of said legs, and each of which is configured to be led through said corresponding middle through bore, and to be brought into threaded engagement with said corresponding middle female threaded hole, to thereby ensure rigidity of interconnection between said front and rear frames.

\* \* \* \* \*